Sept. 10, 1935.  E. R. HOLMES  2,014,331
TRANSMISSION GEAR
Filed Aug. 18, 1932   2 Sheets-Sheet 2

Inventor
Edgar R. Holmes
By A. D. O'Brien
Attorney

Patented Sept. 10, 1935

2,014,331

UNITED STATES PATENT OFFICE 2,014,331

TRANSMISSION GEAR

Edgar R. Holmes, Denver, Colo., assignor to American Gyro Company, Denver, Colo., a corporation of Colorado Application August 18, 1932, Serial No. 629,277

4 Claims. (Cl. 74—343)

This invention relates to improvements in automobile transmissions and has reference to an improved transmission in which means is provided for permitting the driven shaft to overrun the driving shaft in the manner now well known in connection with what is termed "free wheeling."

Another object of this invention is to produce a transmission in which, in addition to the "free wheeling clutch," means is also provided for preventing reverse movement of the driven shaft except under certain predetermined conditions.

A still further object of this invention is to produce a transmission gear mechanism that can be combined with an ordinary transmission mechanism in such a way that it can be applied to any car without material change.

A still further object of this invention is to produce a device of the class described in which the added part shall be of very simple construction and strong and reliable so as to assure successful operation without danger of accidental failure.

The above and other objects that will appear as this description proceeds are attained by means of a construction and an arrangement of parts that will now be described in detail, and for this purpose reference will be had to the accompanying drawings in which the invention has been illustrated in its preferred form, and in which.

Figure 1:
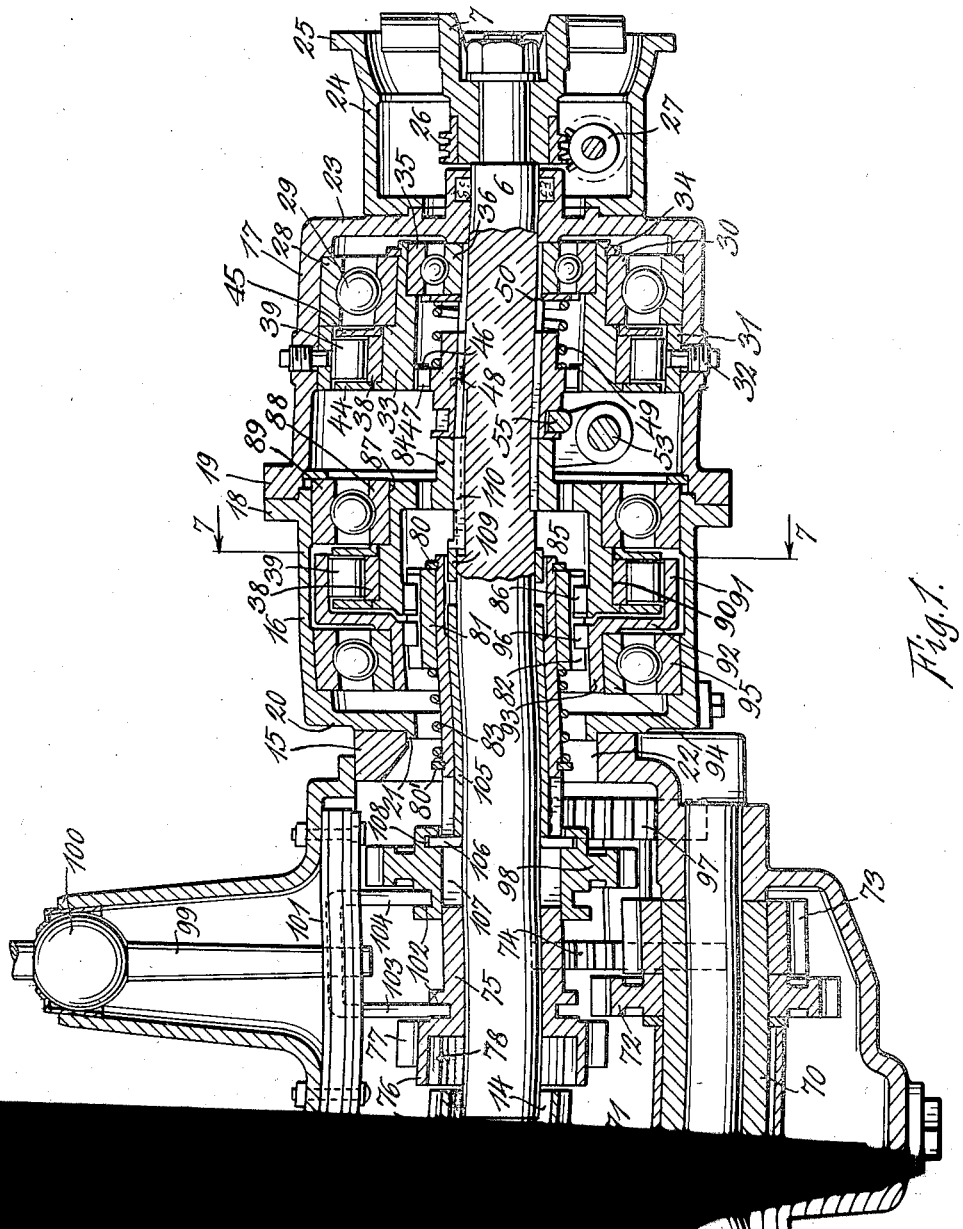
Fig. 1 is a longitudinal section through the improved transmission mechanism that forms the subject of this invention.

In the drawings reference numeral 5 designates the drive shaft which, in an automobile transmission, is connected with one part of the clutch which has not been shown, and reference numeral 6 designates the driven shaft. The rear end of the driven shaft is provided with a universal drive portion 7 that corresponds to the ordinary universal drive employed in all automobiles. The torque shaft from the universal drive to the rear axle has not been illustrated. A part of the transmission gear assembly is enclosed in a housing whose front wall has been designated by reference numeral 8. The rear end of the drive shaft 5 is provided with an enlarged portion 9 whose outer surface has two sets of gear teeth one of which has been designated by reference numeral 10 and the other by reference numeral 11. The teeth designated by reference numeral 11 are part of a direct drive clutch which will be described hereinafter. The elongated portion 9 has an axial opening 12 in which the reduced front end 13 of the driven shaft 6 is journalled. The rear end of part 9 has a recess indicated by reference numeral 14 into which the front end of the shaft 6 extends in the manner shown. The rear wall of the transmission gear casing has been indicated by reference numeral 15 and secured to this is a two-part gear housing comprising sections 16 and 17. These sections are respectively provided with flanges 18 and 19 that are adapted to be secured together by means of bolts which have not been shown. The front end wall of section 16 has been designated by reference numeral 20 and this has a circular flange 21 that extends into the opening 22 in the rear wall 15 of the transmission gear housing. The housing section 16 is secured to the rear wall 15 by suitable bolts which have not been shown. Secured to the rear end wall of section 17 and which has been designated by reference numeral 23 is a universal housing 24 in which the member 7 is located. This housing has a flange 25 that cooperates with another flange of a cooperating portion in a manner well known. Secured to the hub portion of member 7 is a worm 26 that drives a worm gear 27 from which the speedometer is operated. The wall 23 has an opening through which the shaft 6 passes and which, although it does not form a bearing, has a fairly close fit with the shaft so as to prevent the grease from leaking through in excessive quantities. Secured to the inside of section 17 is a bearing comprising a ball race 28 that is separated by means of balls 29 from another ball race 30. The ball race 28 is held in place by a ring 31 that in turn is held in place by means of a plug 32, as shown in Fig. 1. Mounted in the ball race 30 is a clutch member 33.

This clutch member has a cylindrical portion that projects through the ball race 30 and whose outer surface is provided with a groove for the reception of a ring 34 that holds the clutch member and ball race in assembled position. The inner surface of the clutch member 33 has an annular recess in which is located the outer ball race 35. The inner ball race 36 is secured to the driven shaft 6 and therefore when the latter turns the ball bearing comprising members 35 and 36 form the supporting bearing for the same. But if the clutch member 33 is locked nonrotatably to shaft 6 as it usually is, the ball bearing comprising members 28, 29, and 30 forms the bearing in which the shaft 6 rotates. Clutch member 33 forms a part of a nonreverse brake mechanism whose construction has been shown in greater detail in Fig. 7, from which it will be seen that the outer surface of one cylindrical portion of member 33 is provided with a plurality of flattened sections 37 on which are located steel blocks 38. The steel blocks are wedge shaped as shown. Located in alternate recesses between the outer surface of the block and the inner surface of ring 31 is a steel roller 39. Located between the adjacent ends of the steel blocks 38 are arcuate segmental shaped members 40 one end of each of which has a hole 41 for the reception of a spring 42. The springs engage the rollers 39 and tend to force them into the narrow end of the opening between the inclined surfaces of blocks 38 and the inner surface of ring 31. In the embodiment illustrated in Fig. 7, blocks 43 have been shown as alternating with the rollers 39. It will be seen that the outer surfaces of blocks 43 are curved on the same radius as the inner surface of ring 31 and therefore a greater contact area is obtained than can be obtained with the rollers which merely give a straight line contact. The rollers 39 and the blocks 43 are held against longitudinal movement by the outwardly extending flanges 44 and 45, as shown in Fig. 1.

Figure 4:
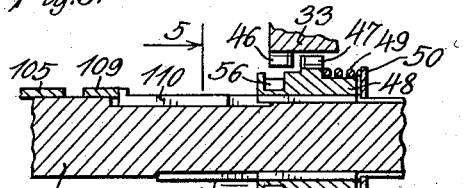
Fig. 4 is a fragmentary sectional view showing the position of certain parts when the nonreverse brake has been disconnected.

Attention is called to the fact that the clutch member 33 is provided with inwardly extending gear or clutch teeth 46 that are adapted to be engaged by outwardly extending teeth 47 on the sliding clutch member 48. Clutch member 48 is secured to shaft 6 by means of splines so that it will not rotate on the shaft, but can be moved longitudinally thereon. A spring 49 extends from the rear surface of the clutch teeth 47 and abuts the ring 50 that in turn contacts with the ball race 36. Spring 49 is under compression and serves to normally hold member 48 in the position shown in Fig. 1 in which position the shaft is directly coupled to the clutch member 33. The clutch of which member 33 forms a part is made in such a way that it will permit shaft 6 to rotate freely in a direction to drive the car forwardly but will prevent reverse rotation and therefore it forms a safety device that positively holds the car against reverse travel when stopped on a steep incline and whenever this nonreverse brake is in operation there is no danger of the car traveling backwards in case the brakes should fail. In Fig. 4 the member 48 has been shown in such a position that the nonreverse brake is disconnected and inoperative. The position of member 48 is controlled by the gear shift lever in a manner that will hereinafter be described and is also controlled by means of a separate mechanism in such a way that it can be disconnected at any time and this makes it possible to disconnect the reverse brake when the car is parked so that it can be moved either forwardly or backwardly as conditions may require.

Figure 6:
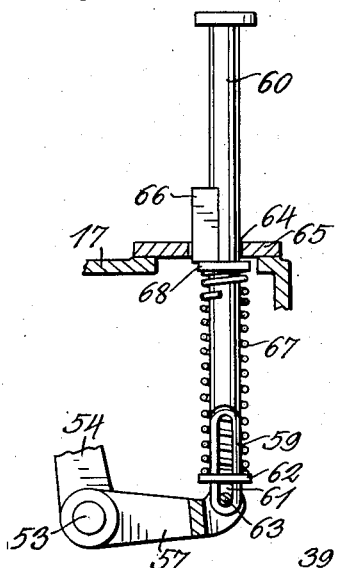
Fig. 6 is a view partly in section and partly in side elevation showing a portion of the control means for the nonreverse brake.
Figure 5:
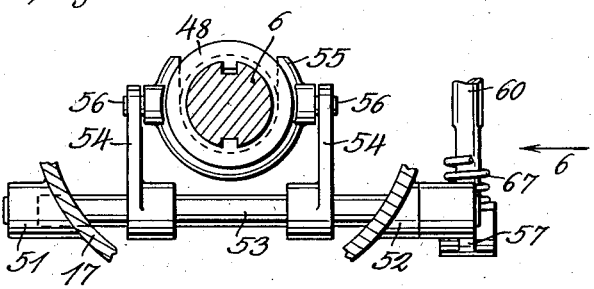
Fig. 5 is a fragmentary sectional view taken on line 5—5, Fig. 4, and shows some of the means employed for controlling the nonreverse brake mechanism.

Referring now more particularly to Figs. 4, 5 and 6 it will be seen that the casing 17 has been provided with two bearings 51 and 52 in which a shaft 53 is mounted. This shaft carries two arms 54 nonrotatably connected to it. Carried by the free ends of arms 52 is collar 55 that is provided with trunnions 56 which engage openings in the ends of the arms 54. The collar 55 has a U-shaped opening that fits into the groove 56 in member 48. When shaft 53 is rocked in one direction it moves the clutch member 48 from the position shown in Fig. 1 to that shown in Fig. 4. For the purpose of rotating or turning the shaft 53, the outer end of this shaft has been provided with an arm 57 whose outer end is forked so as to provide two spaced fingers 58 between which is located the flattened lower end 59 of a plunger 60. The flattened end 59 has a slot 61 and is surrounded by a movable washer 62. A pin 63 extends through the two fingers 58 and through the slot 62 as shown in Fig. 6. The plunger 60 extends through an opening 64 in plate 65 and is provided with a lug 66. A spring 67 encircles the lower end of the plunger and the upper end of this spring abuts a washer 68 that in turn abuts a shoulder on the plunger. A spring 67 is under compression and normally holds the part in the position shown in Fig. 6. Spring 49 is also under compression and unless restrained by some means holds the member 40 in the position shown in Fig. 1 and in this position the cooperating parts are as shown in Fig. 6. When pressure is exerted on top of the plunger 60 it can be moved downwardly and the spring 67 is so proportioned that it will compress the spring 49 sufficiently to disconnect the clutch teeth 46 and 47 and by positioning the upper end of lug 66 against the under surface of plate 64, the nonreverse brake can be held in inoperative position regardless of the position of the transmission lever.

Figure 7:
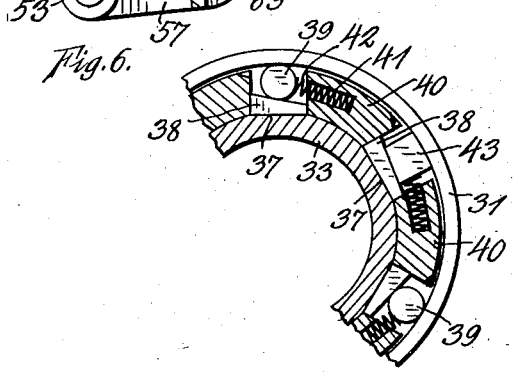
Fig. 7 is a view showing the construction of the clutch mechanism.

Mounted in the ends 8 and 15 of the transmission gear housing is a shaft 69. This shaft carries a sleeve 70 to which are secured three spur gears 71, 72 and 73. These gears are nonrotatably secured to the sleeve so that when one is rotated, all will have to rotate. Gear 71 is in mesh with gear 10 and therefore sleeve 70 will always be rotating whenever the drive shaft turns. Gear 72 is of much smaller diameter than gear 71 and forms part of the intermediate gear drive. Gear 73 is smaller than gear 72 and forms part of the reverse gear mechanism. Gear 73 is in mesh with a gear 74 that rotates idly on a separate shaft. It will be noted that gear 73 is wider than gear 72. Slidably mounted on shaft 6 is a sleeve 75. One end of this sleeve has an enlarged portion 76 on the outer surface of which are formed gear teeth 77. The part 76 is also provided with internal gear teeth 78 that form part of a direct clutch and cooperate with the teeth 11 in the manner shown most clearly in Fig. 3. The rear end of the sleeve 75 is provided with an enlarged cylindrical section 79 and has its outer surface provided with a groove for the reception of a spring ring 80. Slidably and nonrotatably mounted on the rear end of sleeve 75 is a spur gear or clutch member that has been designated by reference numeral 81. The outer surface of this member is provided with teeth 82 that cooperate with teeth on the overrunning clutch mechanism which will presently be described. Sleeve 75 is also provided with another external groove in which is located a ring 80'. A spring 83 has its front end abutting the ring 80' and its rear end abutting the front end of the clutch member 81. Since spring 83 is always under compression it tends to hold the clutch member 81 against the ring 80 in the manner shown in Figs. 1, 2, and 3. The rear ends of teeth 82 are preferably tapered. Splined to the shaft 6 is a combined bearing and clutch member whose hub portion has been designated by reference numeral 84. This member has an annular opening 85 and is provided with inwardly extending clutch or gear teeth 86. Member 84 is also provided with a cylindrical section 87 on which is carried the inner ball race 88 of a ball bearing whose outer ball race 89 is secured to the inside of the member 16. When shaft 6 rotates it will be supported by the bearing just described. The outer surface of that part of member 84 that has been designated by reference numeral 90 is provided with a plurality of flattened portions like those indicated by 37 in Fig. 7 and supported on these are wedge-shaped blocks 38. Rollers 39 or blocks like those indicated by reference numeral 43 in Fig. 7 are supported on the inclined surfaces of the blocks 38 and have their outer surfaces in engagement with the inner cylindrical surface of the clutch member 91. Clutch member 91 has a Z-shaped cross section and has a web 92 that connects the outer cylindrical portion with a cylindrical portion 93 of smaller diameter. A ball bearing comprising two ball races 94 and 95 is located between the outer surface of member 93 and a cooperating cylindrical surface on the inside of member 16. Whenever the clutch member comprising parts 91, 92 and 93 rotates, it will be supported by the ball bearing just described. The cylindrical portion 93 has inwardly extending clutch teeth 96 that correspond in number and pitch to the teeth 86 on the other clutch member. Teeth 82 on member 81 are adapted to project between the teeth 86 and 96 so as to lock these two clutch members against relative rotation. When the member 81 is in the position shown in Figs. 1 and 3, shaft 6, clutch member 84, clutch member 91, clutch member 81 and sleeve 75 rotate as a unit. When the member 81 is in the position shown in Fig. 2, the clutch members 91 and 84 are connected through the one-way clutch comprising the rollers 39 in such a way that shaft 6 will always be driven at a speed at least as great as that of the sleeve 75, but if there is a tendency for the shaft to rotate faster than the sleeve, then the one-way clutch will permit such over drive with the result that the car can coast either down hill or on a flat surface due to its momentum.

Figure 2:
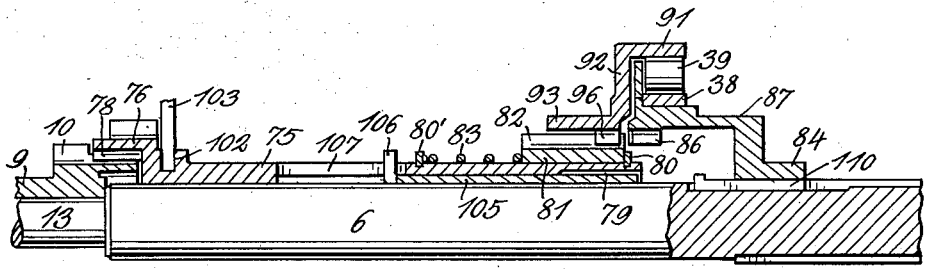
Fig. 2 is a fragmentary sectional view showing the position of the parts when the gears are in high and the free wheeling clutch in operating position.

Free wheeling, so called, is only desirable when the parts are in high gear and even then there are times when a direct connection between the driving and the driven shaft should be had and in order to obtain this, the parts have been so arranged that the sleeve 75 can assume either of two positions during high gear connection, the position shown in Fig. 2 is such that there is no direct connection between teeth 86 and 96 and therefore the free wheeling clutch is in operative position. But when the parts are in the position shown in Fig. 3, the teeth 82 connect the teeth 86 and 96 with the result that the free wheeling clutch is inoperative.

At this point the function of spring 83 will be explained. When the parts are in the position shown in Fig. 2, the teeth 82 are disconnected from the teeth 86 and if the engine is standing still and an attempt is made to shift the gears, it frequently happens that gear teeth 82 will strike the ends of gear teeth 86 and thus prevent gear shifting from taking place. By providing a spring 83 this will be compressed and as soon as the two clutch members rotate relative to each other, the action of spring 83 will force the member 81 against the ring 80 so as to interconnect the two clutch members. The reason for this construction will appear more clearly as the description proceeds.

Located within the transmission housing are two gears 74 and 97 that are connected to the same counter shaft and rotate as a unit. Gear 74 is in mesh with gear 73 and these two gears form part of the reversing mechanism. Slidably but nonrotatably connected with sleeve 75 is a gear 98. This gear can be moved so as to bring it in mesh with gear 73 in which case power is transmitted through gears 10, 71, 73, and 98, this constituting the low gear drive. Gear 98 can also be moved into mesh with gear 97 in which case power is transmitted from shaft 5 through gears 10, 71, 73, 74, 97, and 98, this gear train comprising a reverse gear mechanism. The sleeve 75 and the gear 98 are shifted by means of a gear shift lever whose lower end has been designated by reference numeral 99. This lever has a ball 100 that is journalled in a suitable socket and the lower end extends through an H slot in plate 101. Sleeve 75 has an annular groove 102 in which are engaged the two prongs of a gear shift fork 103 and the gear 98 is also provided with an annular groove in which are engaged the two prongs of a gear shift lever 104. By properly manipulating the gear shift lever sleeve 75 can be moved into the positions shown in Figs. 2 and 3 which are both high speed positions and also rearwardly until the gear 77 comes into engagement with the gear 72 which is the intermediate gear position. By shifting the gear shift lever so as to engage the other forked member 104, gear 98 can be shifted so as to engage the gear 73 or the gear 97. When the parts are in the position shown in Fig. 1, they occupy a neutral position in which power is not transmitted from shaft 5 to shaft 6.

It is apparent that whenever gear 98 is moved into engagement with gear 97 so as to reverse the direction of rotation of shaft 6, the nonreverse brake mechanism must be disconnected and to effect this a sleeve 105 has been provided which is slidably mounted on the shaft 6 and this sleeve has lugs bent at right angles, as indicated by reference numeral 106 and these extend through slots 107 in sleeve 75 and are engaged in the annular groove 108 in the inside of the hub of gear wheel 98. The length of the sleeve 105 is so proportioned that before the gear 98 can be put in mesh with gear 97, it will strike the ring 109 and any further movement will move this ring rearwardly, thereby moving the rod 110, which in turn will move the clutch member 48 so as to disconnect gear teeth 47 from gear teeth 46. By the means just described the nonreverse brake will automatically be moved to inoperative position whenever the gears are so connected that the driven shaft will be reversed with respect to the drive shaft. As has already been described, a separate means is provided for controlling the reverse brake connection so that in parking the car, or wherever occasion requires, the car can be moved in either direction while in neutral position, this can be effected by means of the mechanism shown in Figs. 4, 5 and 6.

The mechanism that has just been described has been designed in such a way that it can be readily applied to the usual standard transmission gear without any radical or expensive changes. The shaft 6 which is shown in the drawing replaces a shorter shaft now employed in the usual transmission and the free wheeling and nonreverse brake mechanisms that are located in the housings 16 and 17 are connected to the standard transmission housing and the torque shaft so as to make proper connection with the universal coupling 7.

Figure 3:
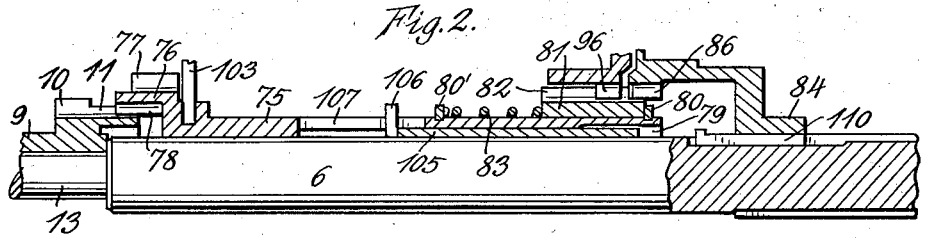
Fig. 3 is a view similar to that shown in Fig. 2, but shows an intermediate high gear position in which the free wheeling clutch is disconnected.

With the mechanism shown on the drawing and described herein, it is possible to get direct drive from the shaft 5 to shaft 6 either through the free wheeling clutch, in which case the parts are in the position shown in Fig. 2, or directly from the sleeve 75 to the clutch member 84, in which case the parts are in the position shown in Fig. 3. In all other positions the free wheeling clutch is inoperative. Normally the nonreverse brake is operative except when the gears are shifted to reverse position, but when required the reverse brake can be moved to inoperative position and held there regardless of the position of the transmission gears as has already been described.

Having described the invention what is claimed as new is:

1. A transmission mechanism comprising, a housing, a drive shaft having one end journaled in a bearing in one end wall of the housing, a pinion attached to the drive shaft and located in the housing, the inner end of the drive shaft having an axial bearing, a driven shaft having one end journaled in the bearing in the drive shaft and the other end journaled in a suitable bearing carried by the housing, an internal gear mounted on the driven shaft and both longitudinally and rotatably movable thereon, the internal gear being provided with a long sleeve-like hub having longitudinally extending spline grooves in its outer surface, a gear mounted on the sleeve and provided with projections for engaging the spline grooves, means for moving the internal gear longitudinally on the driven shaft into and out of engagement with the gear on the drive shaft, means for moving the gear that is carried by the sleeve with respect to the latter, a gear-like member secured to the end of the sleeve, a ring-like clutch member mounted for rotation about an axis concentric with the driven shaft, said last named clutch member having an opening whose sides are provided with inwardly extending teeth adapted to engage the teeth of the gear-like member, a second clutch member secured to the driven shaft and held against relative movement thereon, the last named clutch member having a central opening provided with internal teeth adapted to be engaged by the teeth on the outside of the gear-like member carried by the sleeve, a one-way clutch mechanism interposed between the two clutch members, and means for moving the gear-like member out of engagement with the clutch member that is secured to the driven shaft after the internal gear having the sleeve is moved into engagement with the gear on the end of the drive shaft, whereby power will be transmitted from the drive shaft through the sleeve and through the clutch members and the one-way clutch mechanism, whereby the driven shaft is free to rotate faster than the drive shaft.

2. A transmission mechanism comprising, a housing having an end wall, a drive shaft having one end journaled in a bearing in one end wall of the housing, a pinion carried by the drive shaft and located in the housing, the inner end of the drive shaft having a bearing, a driven shaft having one end journaled in the axial bearing in the end of the drive shaft and the other end journaled in a suitable bearing carried by the housing, an internal gear mounted on the driven shaft and movable thereon both longitudinally and rotatably, the internal gear being provided with a long sleeve-like hub having longitudinally extending spline grooves in its outer surface, a gear mounted on the sleeve and provided with projections for engaging the spline grooves, means for moving the internal gear and sleeve longitudinally on the driven shaft into and out of engagement with the gear on the drive shaft, means for moving the gear that is carried by the sleeve with respect to the sleeve, a gear-like member secured to the end of the sleeve, a ring-like clutch member mounted for rotation about an axis concentric with the driven shaft, said last named clutch member having an opening whose inside is provided with inwardly extending teeth adapted to engage the teeth of the gear-like member, a second clutch member secured to the driven shaft and held against relative movement thereon, the last named clutch member having a central opening provided with internal teeth adapted to engage the teeth on the outside of the gear-like member carried by the sleeve, a one-way clutch mechanism interposed between the two clutch members, and means for moving the gear-like member out of engagement with the clutch member that is secured to the driven shaft when the internal gear having the sleeve is moved into engagement with the gear on the end of the drive shaft whereby power will be transmitted from the drive shaft through the sleeve and through the clutch members and the one-way clutch mechanism and whereby the driven shaft is free to rotate faster than the drive shaft.

3. A transmission mechanism comprising a housing, a drive shaft having one end journaled in a bearing in one end wall of the housing, a pinion on the drive shaft and located in the housing, the inner end of the drive shaft having an axial bearing, a driven shaft having one end journaled in the bearing in the drive shaft and the other end journaled in a suitable bearing carried by the housing, an internal gear mounted on the driven shaft and movable thereon, both longitudinally and rotatably, the internal gear being provided with a long sleeve-like hub having longitudinally extending spline grooves in its outer surface, a gear mounted on the sleeve and provided with projections for engaging the spline grooves, means for moving the internal gear longitudinally on the driven shaft into and out of engagement with the gear on the drive shaft, means for moving the gear that is carried by the sleeve with respect to the latter, a gear-like member slidably secured near one end of the sleeve, a ring-like clutch member mounted for rotation about an axis concentric with the driven shaft, said last named clutch member having a cylindrical opening whose sides is provided with inwardly extending teeth adapted to engage the teeth of the gear-like member, a second clutch member secured to the driven shaft and held against relative movement thereon, the last named clutch member having a central cylindrical opening provided with internal teeth adapted to engage the teeth on the outside of the gear-like member carried by the sleeve, and a one-way clutch mechanism interposed between the two clutch members. means for moving the gear-like members out of engagement with the clutch members that is secured to the driven shaft when the internal gear having the sleeve is moved into engagement with the gear on the end of the drive shaft whereby power will be transmitted from the drive shaft through the sleeve and through the clutch members and the one-way clutch mechanism and whereby the driven shaft is free to rotate faster than the drive shaft.

4. A power transmission gear comprising, in combination, a housing, a drive shaft rotatably carried by the housing, one end of the drive shaft being located inside of the housing and having a spur gear, the inner end being also provided with an axial bearing, a driven shaft in axial alignment with the drive shaft, an elongated sleeve mounted on the driven shaft for rotary and longitudinal movement thereon, the end of the sleeve nearest the drive shaft having an enlarged portion provided with internal gear teeth that are adapted to engage the teeth on the drive shaft, means for moving the sleeve on the driven shaft, a clutch member secured to the driven shaft, the clutch member having a cylindrical opening concentric with the driven shaft and provided with a row of inwardly extending gear teeth, a second clutch member journaled in the housing and rotatable about the axis of the driven shaft, the second clutch member being also provided with a row of internal gear teeth of the same pitch as those on the other clutch member, a tubular connector splined to the outside of the sleeve, said last named member having external teeth that are adapted to cooperate with the internal teeth on the clutch members, the parts being so proportioned that when the sleeve is in its extreme forward position in which it is rotatably interlocked with the drive shaft, the tubular connector will be disconnected from the teeth on the clutch member carried by the driven shaft and means for shifting the sleeve longitudinally on the driven shaft.

EDGAR R. HOLMES.